United States Patent [19]

Korsunsky et al.

[11] Patent Number: 4,858,309

[45] Date of Patent: Aug. 22, 1989

[54] EXTRACTION TOOL

[75] Inventors: Iosif Korsunsky, Harrisburg; Steven P. Bateman, Hummelstown; Richard C. Schroepfer, Thompsontown, all of Pa.

[73] Assignee: AMP Incorporated, Harrisburg, Pa.

[21] Appl. No.: 212,828

[22] Filed: Jun. 28, 1988

[51] Int. Cl.[4] .......... B23P 19/04

[52] U.S. Cl. .......... 29/764; 29/278; 294/15

[58] Field of Search .......... 29/747, 758, 759, 762, 29/764, 278; 294/1.1, 15, 26

[56] References Cited

U.S. PATENT DOCUMENTS

| | | | |
|---|---|---|---|
| 3,178,214 | 4/1965 | Tinkelenberg | 294/26 X |
| 3,484,129 | 12/1969 | Askren . | |
| 3,538,580 | 11/1970 | Bruner . | |
| 3,617,083 | 11/1971 | Koppensteiner et al. . | |
| 3,896,533 | 7/1975 | Ullman et al. . | |
| 3,903,576 | 9/1975 | Stein . | |
| 4,109,379 | 8/1978 | Ratti et al. . | |
| 4,737,120 | 4/1988 | Grabbe et al. . | |

FOREIGN PATENT DOCUMENTS

2182/77 1/1977 Japan .

OTHER PUBLICATIONS

IBM Technical Disclosure Bulletin, "Extraction and Insertion Tool for Printed Circuit Cards", Yevchak et al.

*Primary Examiner*—Joseph M. Gorski
*Attorney, Agent, or Firm*—Bruce J. Wolstoncroft

[57] ABSTRACT

An extraction tool (2) for removing circuit boards (4) from connectors (6) comprises printed circuit board retaining channels (52, 52') for frictionally engaging the circuit board (4) and camming member (54, 54') for cooperation with latching arm (18) of the connector (6). The tool (2) is made from two body portions (20, 22), the body portions (20, 22) being movable with respect to each other, enabling the tool (2) to compensate for various sizes of circuit boards (4). As the tool (2) is inserted onto the circuit board (4), channels (52, 52') provided in legs (46, 46') of the tool (2) frictionally engage edges of the circuit board (4). As insertion continues, the camming arms (54, 54') engage the latching arms (18) of the connector (6), thereby moving the latching arms (18) from the circuit board (4). With the latching arms (18) disengaged from the board (4), the tool (2) is retracted. The frictional engagement between the channels (52) and the edges of the board (4) causes the board (4) to be removed as the tool (2) is retracted. The operation of the tool (2) provided for the easy removal of the circuit board (4) from the connector (6), even when the connectors (6) are closely spaced together.

13 Claims, 4 Drawing Sheets

EXTRACTION TOOL

FIELD OF THE INVENTION

The invention relates to an extraction tool for removing printed circuit boards and the like from a connector. In particular, the invention is directed to a tool which operates to unlock and remove the circuit board from the connector in a confined area.

BACKGROUND OF THE INVENTION

As technology advances, computers, as well as other electronic devices, are required to perform more complicated tasks. In order to respond, the circuitry found in the computers has become more complex. The complexity of the circuitry combined with the limited space available in the computer has caused the need for the circuitry to be densely spaced. The high density packaging requirements of the circuitry has caused problems in the design and engineering of the terminals and connectors to be used. In other words, miniaturized connectors must be used to perform the various electrical functions required.

The use of miniaturized connectors has allowed for the more sophisticated computers to be built in smaller areas than their less sophisticated parents. An example of a connector which has been designed with the electrical properties required while occupying a minimal area is described in U.S. Pat. No. 4,737,120. This connector provides the electrical connection required between baby boards and mother boards. As is described in U.S. Pat. No. 4, 737,120, the connection between the boards is made more reliable due to the fact that the baby boards are latched in position.

However, this high density spacing of the connectors has caused problems in the repair and replacement of the parts. It is difficult to access or remove baby boards and the like from the connectors due to the high density of the connectors. Consequently, various methods are employed to remove the boards from the connector. These methods can result in damage to the boards, which is an unacceptable result. In the connector explained above, the removal of the baby boards is complicated by the fact that the boards are latched to the connector, so that upon removal of the boards from the connector, the latches must be disengaged.

In order to insure that the repair and replacement of the baby boards does not damage the boards, it is essential that an extraction tool be used. There are various extraction tools which are on the market, however these tools are complicated, and consequently expensive to manufacture. Another problem associated with the prior art tools is the fact that the extraction tools do not have the capability to unlatch the latching means of a connector. In other words, if the baby boards are latched to the connectors, the boards must be unlatched by hand, and then the extraction tool may be used. This process is time consuming and can damage the boards.

It would be beneficial to have an extraction tool which unlatches and removes the baby boards in one continuous motion. However, in order to be practical the tool must be able to cooperate with a variety of sized of boards, as well as being inexpensive to manufacture.

SUMMARY OF THE INVENTION

The invention is directed to an extraction tool which is configured to remove printed circuit boards for connectors without damaging either the boards or the connectors. The extraction tool is adjustable, thereby enabling it to be used for a wide variety of circuit boards and connectors.

The extraction tool is for use with connectors having latching means provided thereon. The latching means cooperate with latching areas of the printed circuit board to maintain the printed circuit board in position during the operation of the connector.

The hand tool comprises a body portion which has a first major surface and a second major surface. Edge surfaces extend between the first and the second major surfaces.

Leg portions are provided and extend from a respective edge surface of the body portion. The leg portions have first surfaces and second surfaces which are essentially parallel to the first and second major surfaces respectively.

Printed circuit board receiving channels are provided proximate the leg portions. The receiving channels have sidewalls, and end wall and open end, and are dimensioned such that as the tool is inserted onto a printed circuit board, the end walls of the receiving channels frictionally engage edges of the printed circuit board.

Camming means are provided on the leg portions. The camming means cooperate with the latching means of the connector to unlatch the printed circuit board from the connector, thereby allowing the printed circuit board to be removed from the connector.

DETAILED DESCRIPTION OF THE INVENTION

Figure 1:
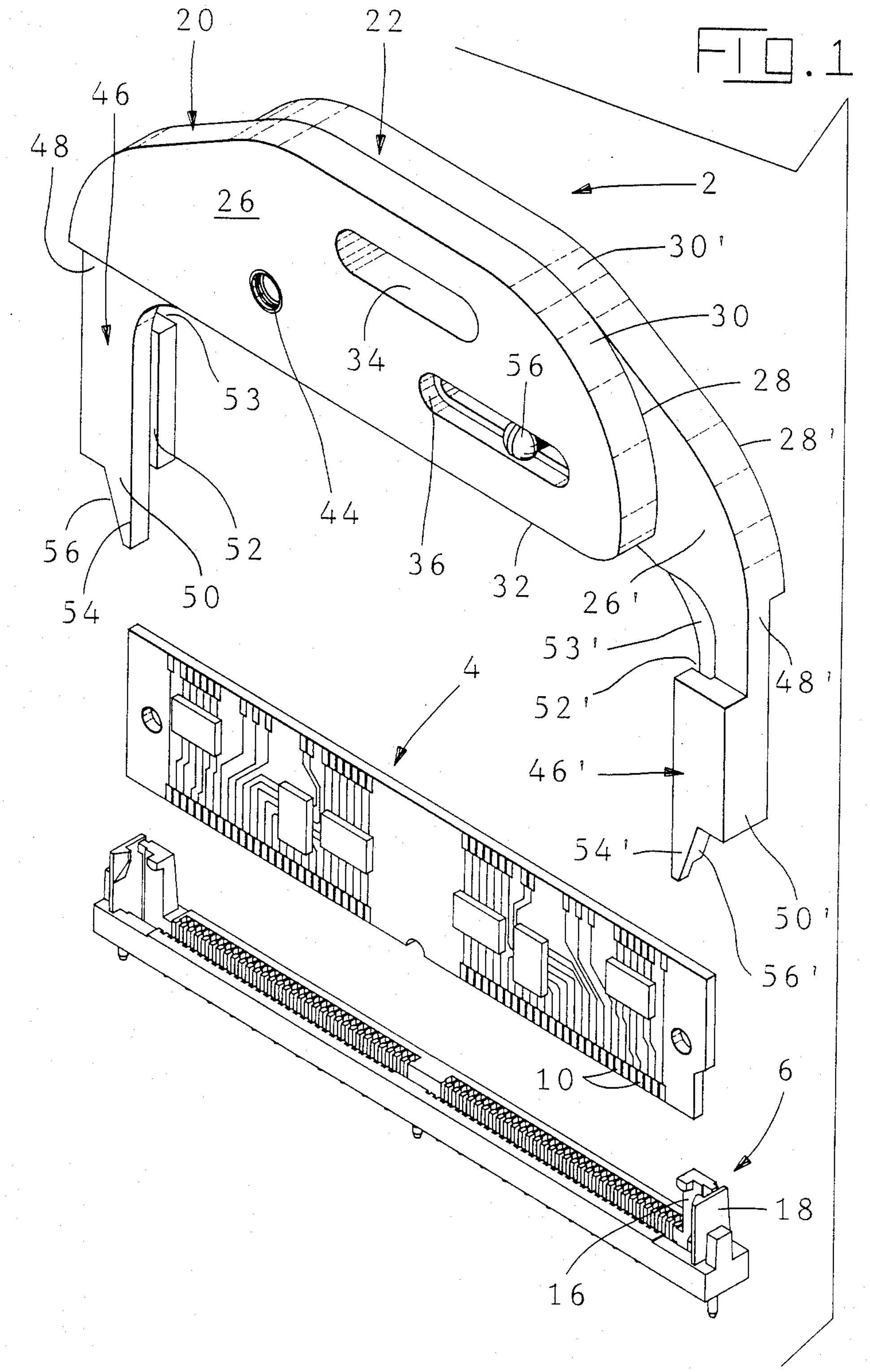
FIG. 1 is a perspective view showing a circuit board exploded from a connector with an extraction tool provided proximate the circuit board.

Extraction tool 2 is configured to extract printed circuit boards 4 and the like from various connectors 6. One such connector is disclosed in U.S. Pat. No. 4,737,120, which is hereby incorporated by reference. Connector 6 has terminals which extend therethrough to electrically connect conductive areas 10 of printed circuit board 4 with conductive areas of printed circuit board 4. The configuration of the terminals allows connector 6 to be used in high density applications. In other words, the insertion of printed circuit board 4 into connector 6 requires only a minimal amount of space.

In order to maintain conductive areas 10 of circuit board 4 in electrical engagement with the terminals, locking posts 16 and resilient latching arms 18 are provided on connector 6. Locking posts 16 and resilient latching arms 18 cooperate with the fully inserted circuit board 4 to maintain circuit board 4 in a fully inserted position. This type of cooperation insures that circuit board 4 will be maintained in electrical engagement with terminals 8.

Although locking posts 16 and resilient latching arms 18 insure that a positive electrical connection is maintained, posts 16 and arms 18 create a problem when printed circuit board 4 is to be removed from connector 6. As connector 6 and circuit board 4 are normally maintained in a dense environment, it becomes extremely difficult to remove, to replace or to repair, circuit boards 4 from connectors 6, without causing irreparable harm to the connector. The present invention is directed to tool 2 without damaging the printed circuit board 4 or the connector 6.

Figure 2:
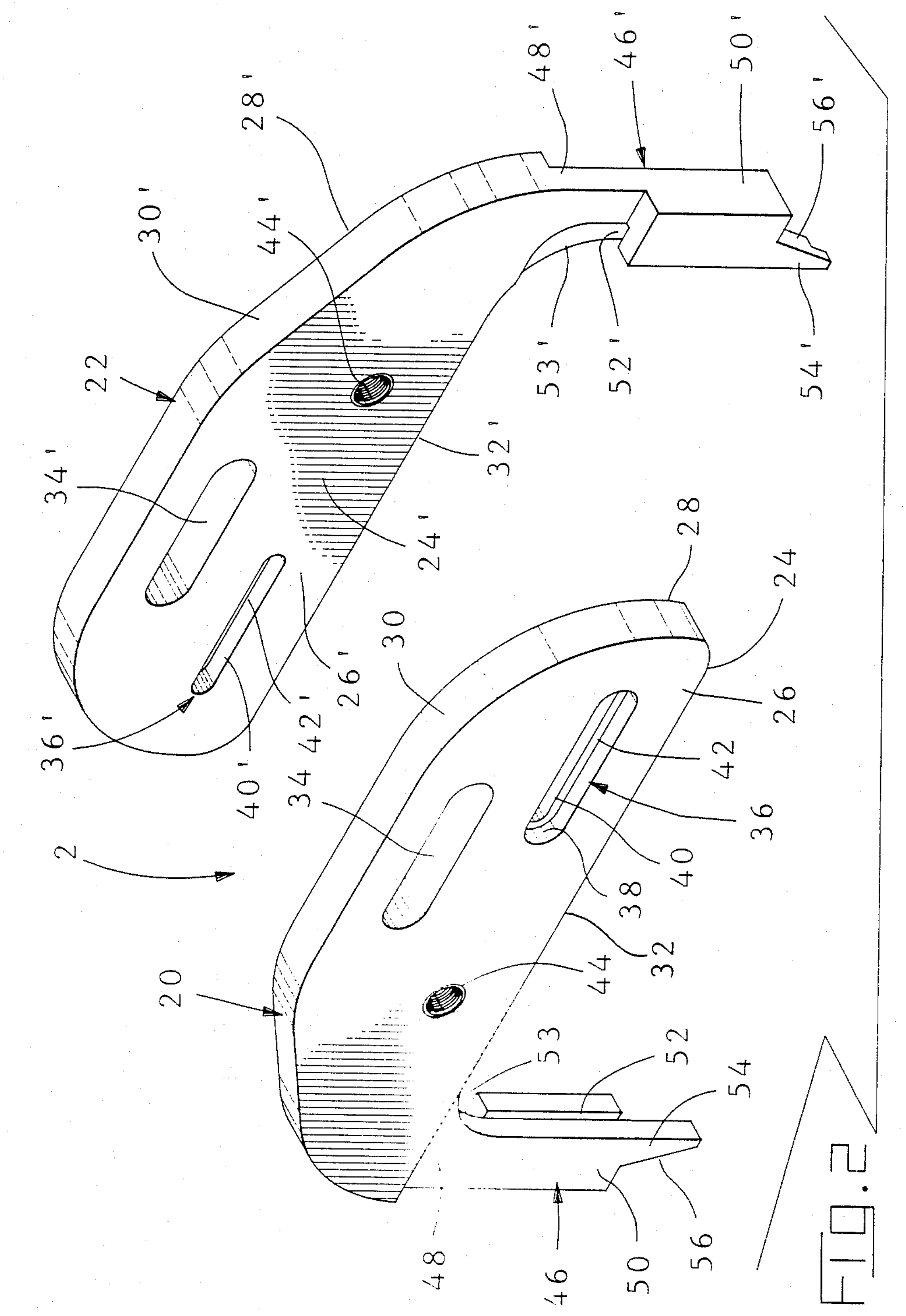
FIG. 2 is an exploded perspective view showing the two housing members of the extraction tool.

As is best shown in FIG. 2, tool 2 has a two part housing 20, 22. First housing 20 and second housing 22 are essentially identical. Therefore, for ease of explanation and understanding only housing 20 ill be described in detail. However, the same numbers with prime marks positioned thereafter will be used for housing 22.

As shown in FIG. 2, housing 20 has a main body portion 24 which has a generally D-shaped configuration. Body portion 24 has a first major surface 26, a second major surface 28, and side surfaces 30, 32 which extend between first and second major surfaces 26, 28. A slot 34 is positioned in housing 20 proximate side surface 30. Slot 34 extends from first major surface 26 to second major surface 28.

Elongated opening 36 is provided in housing 20 proximate side surface 32. Opening 36 extends from first major surface 26 to second major surface 28. As is best shown in FIG. 2, opening 36 consists of a wide portion 38 and a narrow portion 40. A ledge 42 is provided to separate portion 38 from portion 40. A circular opening 44 is also provided proximate side surface 32. Circular opening 44 has threads provided on the side walls thereof, the opening extending from the first major surface 26 to the second major surface 28.

Figure 3:
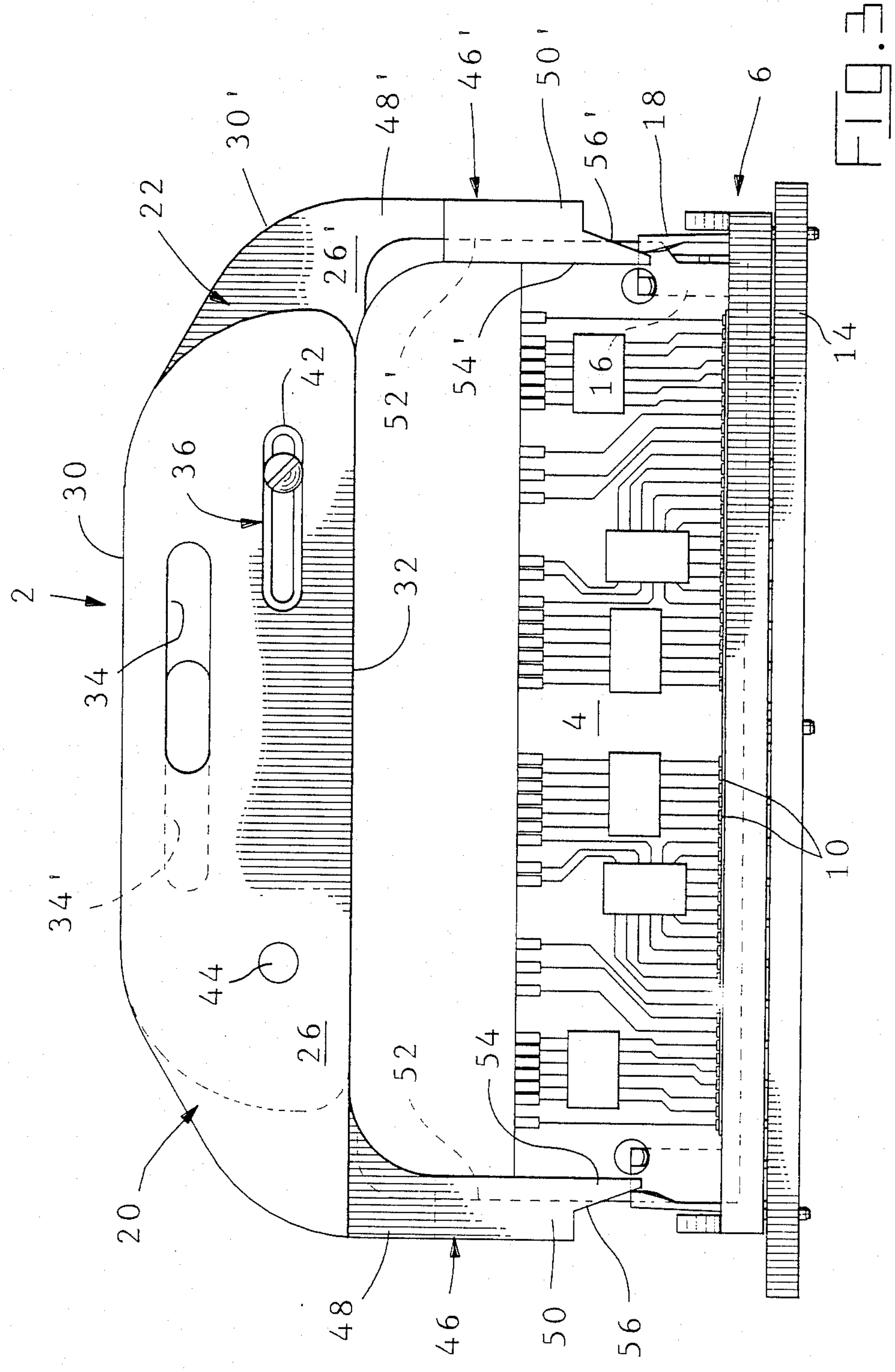
FIG. 3 is a side view showing the extraction tool inserted onto the circuit board, prior to camming means of the tool engaging latching means of the connector.

Retaining leg 46 extends from side surface 32 of housing 20 in a direction away from side surface 30. As is best shown in FIGS. 2 and 3, retaining leg 46 extends in a direction which is essentially perpendicular to the plane of side surface 32.

Figure 5:
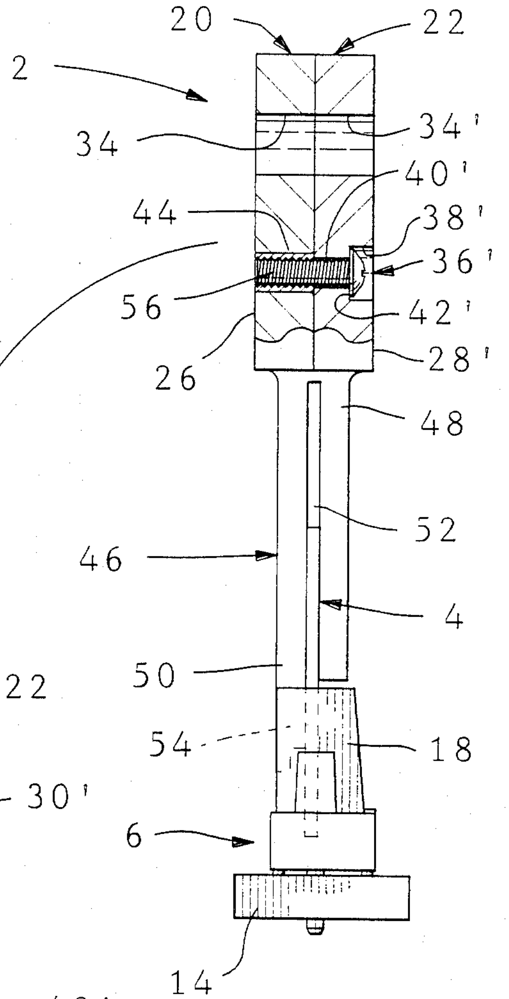
FIG. 5 is a cross-sectional view of the extraction tool, showing the extraction tool fully inserted into the connector.

Retaining leg 46 has a first end portion 48 and a second end portion 50. The first end portion 48 is integral with side surface 32 of housing 20. The second end portion 50 is spaced from the side surface 32. As is shown in FIGS. 2 and 5, a channel 52 is provided in retaining leg 46, the channel extending from proximate first end portion 48 to second end portion 50. As will be more fully described, channel 52 is dimensioned to frictionally engage printed circuit board 4. In order to enhance the frictional engagement between the retaining leg 46 and the circuit board 4 various holding devices may be placed in channel 52. These devices include, but are not limited to, embossments, chinese fingers, etc.

As is shown in FIGS. 1 and 2, retaining leg 46 has an open section 53 proximate first end portion 48. Section 53 is provided so that the operator can observe printed circuit board 4 when board 4 is inserted into channels 52 of leg 46.

Figure 4:
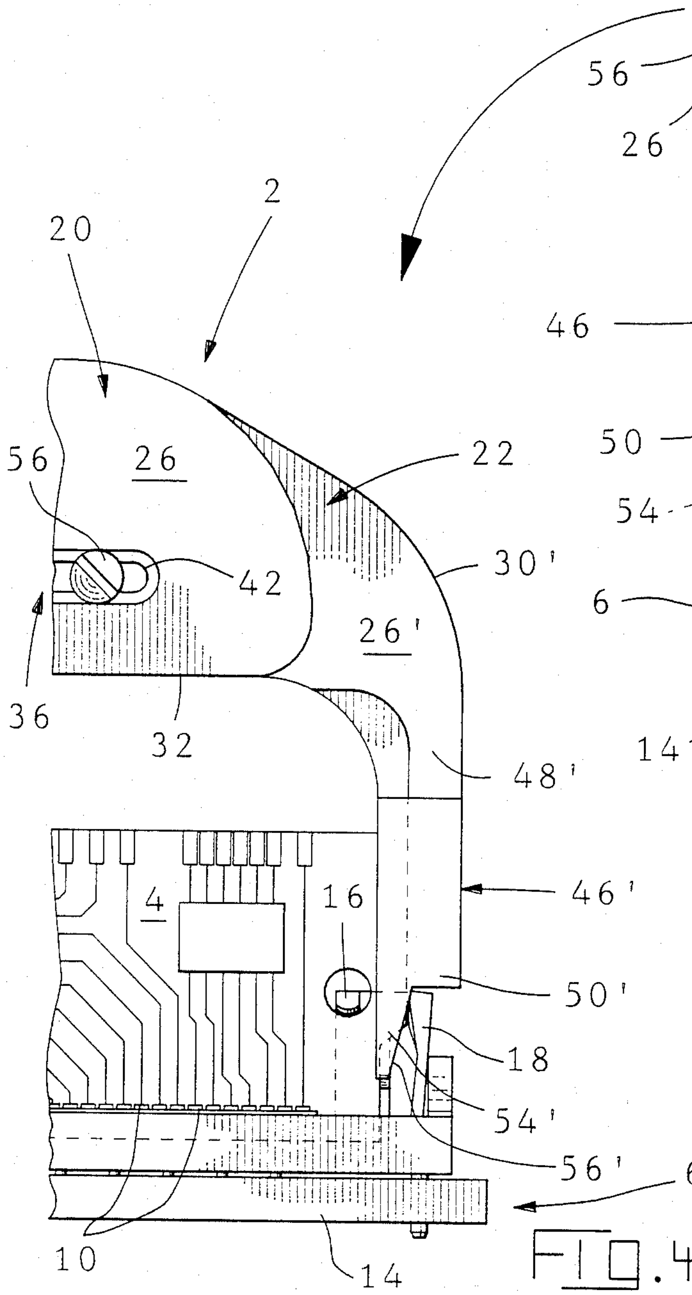
FIG. 4 is a partial side view of the extraction tool fully inserted onto the circuit board the camming means are in engagement with the latching means.

A camming member 54 extends from second end portion 50 of leg 46. Outside surface 56 of camming member 54 is sloped, as is best shown in FIGS. 3 and 4. As is shown in FIGS. 1 and 2, camming members 54, 54′ have different configurations. The width of camming member 54′ is smaller than the width of camming member 54 so that camming member 54′ will move past the locking post, as shown in FIG. 4. However, the operation of camming members 54, 54′ are identical.

Housings 20, 22 are positioned next to each other and secured in position by screws 56. It should be noted that other fastening means may be used to secure housings 20, 22 together. As is shown in FIG. 5, screws 56 are inserted through elongated openings 36, 36′ into openings 44, 44′. With screws 56 tightened against ledge 42, 42′, housing 20 is not movable relative to housing 22. However, with screws 56 slightly loosened, screws 56 may slide in elongated openings 36, 36′, thereby allowing housing 20 to be slidably movable with respect to housing 22. This is an important feature of tool 2, as the movable housings 20, 22 allow the same tool 2 to be used for a wide range of printed circuit board sizes.

With tool 2 adjusted to the proper size, tool 2 is inserted onto board 4. As insertion occurs channels 52 engage the side edges of board 4, such that channels frictionally engage the edges, as is shown in FIG. 3. As insertion continues, camming members 54 contact resilient latching arms. This engagement causes latching arms to be moved away from printed circuit board 4, as is shown in FIG. 4, thereby allowing circuit board 4 to be removed from connector 6.

With latching arms moved from board 4, tool is pivoted, as indicated by the arrow of FIG. 5. This returns board 4 to the plane of insertion. Tool 2 is then retracted from connector 6. The frictional engagement of channel 52 with the edges of board 4 cause the board to be removed from connector 6 as tool 2 is retracted. The operator then easily removes board 4 from tool 2, thereby allowing for the repair or replacement of the board in the connector.

Tool 2 can be made from any material having the strength characteristics required. The use of tool 2 insures that boards 4 can be removed from connector 6 without damaging connector 6 or board 4.

Changes in construction will occur to those skilled in the art and various apparently different modifications and embodiments may be made without departing from the scope of the invention. The matter set forth in the foregoing description and accompanying drawings is offered by way of illustration only.

We claim:

1. An apparatus for removing a printed circuit board from a connector, the connector having latching means provided thereon, the latching means cooperate with latching areas of the printed circuit board to maintain the printed circuit board in position during operation of the connector, the apparatus comprising:

a body portion having a first major surface and a second major surface, edge surfaces extend between the first major surface and the second major surface;

leg portions extending from a respective edge surface of the body portion, the leg portions having first and second surfaces, the first surfaces of the leg portions being essentially parallel to the first major surface of the body portion, and the second surfaces of the leg portions being essentially parallel to the second major surface of the body portion;

printed circuit board receiving channels provided proximate the leg portions, each receiving channel having an end wall and an open end, the receiving channels being dimensioned such that as the apparatus is inserted onto a printed circuit board, the end walls of the receiving channels frictionally engage edges of the printed circuit board;

camming means provided on the leg portions, the camming means engage the latching means as the apparatus is inserted onto the printed circuit board, so that the camming means causes the latching means to move away from the printed circuit board as the apparatus is inserted onto the printed circuit board, thereby allowing the printed circuit board to be removed from the connector.

2. An apparatus as recited in claim 1 wherein the body portion and the leg portions have a generally C-shaped configuration.

3. An apparatus as recited in claim 1 wherein the body portion is comprised of two parts of insulating material, the parts being movable with respect to each other, such that the length of the body portion can be adjusted to correspond to printed circuit boards of various lengths.

4. An apparatus as recited in claim 3 wherein each part of the body portion has a one of the leg portions extending therefrom, such that as the parts of the body portion are adjusted to correspond to the length of the printed circuit board, the leg portions are moved accordingly, thereby enabling the receiving channels of the leg portions to frictionally engage the edge of printed circuit boards of varying lengths.

5. An apparatus as recited in claim 3 wherein the two parts of the body portion are hermaphroditic.

6. An apparatus as recited in claim 1 wherein the camming means are cam surfaces which are provided at the ends of the leg portions, such that as the apparatus is inserted onto the printed circuit board, the cam surfaces cooperate with the latching means provided on the connector to disengage the latching means from the printed circuit board, thereby enabling the printed circuit board and the apparatus to be rotated from a first position to a second position, in order to facilitate the removal of the printed circuit board from the connector.

7. An extraction tool for extracting printed circuit boards from connectors, the extraction tool comprising:

a frame having a printed circuit board receiving recess provided therein;

engagement means provided on the frame, the engagement means cooperates with the printed circuit board to maintain the printed circuit board in engagement with the extraction tool as extraction of the printed circuit board occurs;

camming means provided proximate the engagement means, the camming means cooperate with the connector to unlatch the printed circuit board from the connector;

so that as the extraction tool is inserted onto the printed circuit board, so that the printed circuit board is provided in the printed circuit board receiving recess of the frame, the camming means engages latch means of the connector to unlatch the circuit board from the connector, and the engagement means frictionally engages edges of the printed circuit board, such that after the extraction tool is fully inserted onto the printed circuit board, the extraction tool with the printed circuit board positioned in the printed circuit board receiving recess is rotated from a first position to a second portion, and the extraction tool with the printed circuit board retained in the printed circuit board receiving recess is withdrawn, causing the printed circuit board to be removed from the connector.

8. An extraction tool as recited in claim 7 wherein the frame comprises:

a body portion having a first major surface and a second major surface, edge surfaces extend between the first major surface and the second major surface; and leg portions extending from a respective edge surface of the body portion, the leg portions having first surfaces and second surfaces, the first surfaces of the leg portions are essentially parallel to the first major surface of the body portion, and the second surfaces of the leg portions are essentially parallel to the second major surface of the body portion.

9. An extraction tool as recited in claim 8 wherein the leg portions have printed circuit board receiving channels, the receiving channels having end walls which act as the engagement means, the receiving channels being dimensioned such that as the apparatus is inserted onto a printed circuit board, the end walls of the receiving channels frictionally engage edges of the printed circuit boards.

10. An apparatus as recited in claim 8 wherein the body portion is comprised of two parts of insulating material, the parts being movable with respect to each other, such that the length of the body portion can be adjusted to correspond to printed circuit boards of various lengths.

11. An apparatus as recited in claim 10 wherein each part of the body portion has one of the leg portions extending therefrom, such that as the parts of the body portion are adjusted to correspond to the length of the printed circuit board, the leg portions are moved accordingly, thereby enabling the leg portions to frictionally engage the edges of printed circuit boards of varying lengths.

12. An apparatus as recited in claim 10 wherein the two parts of the body portion are hermaphroditic.

13. An apparatus as recited in claim 7 wherein the camming means are cam surfaces which are provided at the ends of leg portions provided on the frame, such that as the apparatus is inserted onto the printed circuit board, the camming surfaces cooperate with the latch means provided on the connector to disengage the latch means from the printed circuit board.

* * * * *